United States Patent [19]

Verrips et al.

[11] 4,336,272

[45] Jun. 22, 1982

[54] PROCESS FOR THE PREPARATION OF AN OIL-IN-WATER EMULSION

[75] Inventors: Cornelis T. Verrips; Renée van Rhee, both of Maassluis, Netherlands

[73] Assignee: Lever Brothers Company, New York, N.Y.

[21] Appl. No.: 198,084

[22] Filed: Oct. 17, 1980

[30] Foreign Application Priority Data

Oct. 25, 1979 [NL] Netherlands .................... 7907831

[51] Int. Cl.³ .............................................. A23D 5/00
[52] U.S. Cl. .................................. 426/250; 426/602; 426/605; 426/613
[58] Field of Search ................ 426/602, 605, 613, 250

[56] References Cited

U.S. PATENT DOCUMENTS

| | | | |
|---|---|---|---|
| 2,781,270 | 2/1957 | Crawford et al. | 426/602 |
| 2,844,469 | 7/1958 | Melnick et al. | 426/605 X |
| 2,944,906 | 7/1960 | Spitzer et al. | 426/605 |
| 3,764,347 | 10/1973 | Katz | 426/602 |
| 3,955,010 | 5/1976 | Chozianin et al. | 426/605 |

FOREIGN PATENT DOCUMENTS

719594 10/1980 U.S.S.R. ............................ 426/602

*Primary Examiner*—Robert A. Yoncoskie
*Attorney, Agent, or Firm*—Irving N. Feit; James J. Farrell; Melvin H. Kurtz

[57] ABSTRACT

Oil-in-water emulsions, which are microbiologically stable upon storage, consisting of oil, water, thickeners, emulsifiers, and optional further ingredients, are obtained by subjecting at least one of these components to an osmotic and/or acid shock and to a temperature shock by heating said component(s) within 3 minutes, preferably within 1 minute, to 40°–55° C., preferably to 45°–50° C., and processing the thus treated component(s) with the remaining ingredients into a final emulsion, during which the temperature of the final emulsion up to and including the filling and hermetically sealing of the containers into which it is being packed, is maintained at 40°–55° C. Preferably the temperature shock is achieved by adding during the preparation of the final emulsion a thickener suspension having a temperature of 70°–95° C. to the remaining components which have been subjected to an osmotic and/or acid shock.

14 Claims, No Drawings

PROCESS FOR THE PREPARATION OF AN OIL-IN-WATER EMULSION

The invention relates to a process for the preparation of an oil-in-water emulsion which is microbiologically stable upon storage, based on oil, water, a thickener, an emulsifier and optionally other ingredients. More particularly the invention relates to a process for the preparation of an oil-in-water emulsion of the mayonnaise, French dressing or salad dressing type.

Such a process is known from Japanese Patent Specification No. 73001514 (Q.P. Corporation), in which a process is described for the sterilisation of oil-in-water emulsions already filled in containers, whereby the packaged emulsion is heated for 8 to 24 hours to 45°–55° C. Mayonnaise with an acetic acid content of 0.25 to 1.0% by weight was filled into glass containers and these containers were packed in corrugated board cases. The corrugated board cases were heated for 8 to 24 hours in an incubator at 45° C. or 50° C. The disadvantage of this known process is that in commercial production great quantities of packaged product have to be heated for a long time, by which a continuous production is seriously hindered and much energy has to be consumed, which particularly these days is a serious draw-back. Moreover, the packaged product has to be heated very slowly, because a rapid heating would seriously endanger the physical stability of the oil-in-water emulsion. In this known process, no decrease is achieved of the amount of microorganisms during the preparation of the end product, so that these have to be inactivated in a subsequent step, which makes this process cumbersome.

For years on end the philosophy among a great many manufacturers of oil-in-water emulsions has been that these emulsions should be stable against acetic acid adapted yeasts, lactobacilli and moulds. This approach is based on the advantage that during storage of the emulsion in sealed containers and after the containers have been opened, the product will not get contaminated. When providing conditions resulting in a product that is stable against acetic acid adapted microorganisms, there is the inherent disadvantage that the product must contain chemical preservatives, which are used to inhibit the growth of unacceptable microorganisms, and which include sorbic acid, benzoic acid, propionic acid or sulphite, and/or a large proportion of acetic acid.

There is, however, an ever increasing want for milder, preservative-free products. In order to meet these requirements, ever higher demands have been made upon (1) the microbiological quality of the raw materials, such as spices, vinegars, proteins, and emulsifiers;

(2) the decontamination of the process lines;

(3) optimum aseptic conditions when filling the products into containers;

(4) the quality control of the end product.

All these measures are both time-consuming and uneconomical.

We have now found a process which on the one hand alleviates the disadvantages of the aforesaid known process, and which on the other hand enable the preparation of products to which no chemical preservatives need to be added.

Accordingly the present invention relates to a process for the preparation of an oil-in-water emulsion which is microbiologically stable upon storage, based on oil, water, a thickener, an emulsifier, and optionally other ingredients, which is characterized in that one subjects at least one of the above-defined components—often the component(s) which probably will be contaminated most—to an osmotic and/or acid shock, and to a temperature shock by bringing its (their) temperature within 3 minutes to 40°–55° C., and processes the thus treated component or components with the remaining ingredients into a final emulsion which is filled into containers, care being taken that the temperature of the final emulsion up to and including the filling and sealing of the containers is maintained within the temperature range of 40°–55° C.

In the process according to the invention a maximum physiological shock is achieved by applying, preferably within one minute and ideally simultaneously, an osmotic shock, an acid shock and a temperature shock. Preferably, the acid shock and the temperature shock are applied in the briefest possible succession. When the osmotic shock, the acid shock and the temperature shock are not carried out simultaneously, one first applies the acid shock and then the temperature shock.

The osmotic shock may imply both a positive and a negative shock. A positive osmotic shock is achieved by contacting the component to be decontaminated with preferably salts, sugars, polyhydric alcohols, such as glycerol, and the like. The presence of sugars also contributes to the mildness of the final emulsion by reducing the hardness of too strong an acid taste and/or flavour. A negative osmotic shock is achieved in that a mixture of the component to be decontaminated and agents increasing the osmotic pressure is diluted with a solvent, for instance an aqueous suspension of a thickener.

A positive acid shock is achieved by contacting the component to be decontaminated with an acid, such as citric acid, lactic acid, hydrochloric acid, phosphoric acid, tartaric acid, malic acid or acetic acid, which will result in a decrease of the pH. It is believed that a sudden sharp increase occurs of the intracellular concentration of undissociated acid, leading to irreversible denaturation of the vital biopolymers and dying of the cell. Sometimes the use of a mixture of acids can be advantageous.

The present invention is based on the discovery that in the preparation of oil-in-water emulsions the viability of microorganisms can be decreased appreciably and decontamination can be achieved at temperatures below the normal pasteurization temperature, in particular at a temperature ranging from 40°–55° C., preferably from 45°–50° C., provided an osmotic and/or acid shock and a temperature shock are applied in the manner as indicated. Thus it is possible to decontaminate emulsions without loss of the physical stability caused by too high a temperature ($\geq 55°$ C.). This makes the process of special importance for products such as mayonnaise, French dressing or salad dressing, which usually contain more than 10% by weight of oil.

In a preferred embodiment of the process according to the invention the temperature shock is achieved by adding a hot, aqueous suspension of a thickener to the component(s) subjected to the osmotic and/or acid shock. Naturally, the temperature shock is greater in proportion as the difference between the temperature of the components to be subjected to the shock and the temperature of the component used for carrying out the shock is greater. At the start of the process the components to be subjected to the temperature shock will generally be of ambient temperature (20° C.), so that there will be a difference in temperature of at least 20° C. between the initial temperature of the components to be treated and the lower limit of the temperature range of the temperature shock (40°–55° C.). This difference in temperature should be neutralized as quickly as possible, preferably within 3 minutes, more preferably with 1 minute. Preferably the temperature shock is brought about by means of a heated aqueous suspension of the thickener. The thickener may comprise a hydrocolloid as usually employed, a gum, a mixture of gums, or a modified or an unmodified starch, or a mixture of starches. Preferably unmodified starch is used. To achieve particular results it may sometimes be desirable to use both a gum and a starch. In the process according to the invention preferably an aqueous suspension of starch is heated to 70°–95° C. for a period of time sufficient to achieve swelling of the starch, and thereafter a suitable proportion of this suspension is added in a hot condition to the components treated with agents for increasing the osmotic pressure and/or with acids, preferably with quick and intensive stirring. Thus an acid, aqueous suspension comprising thickener, spices, flavouring substances, particles of vegetables, meat, chicken and/or fish and having a temperature of from 70°–95° C., is quickly added with vigorous stirring to a mixture which contains an emulsifier and an oil and which has been subjected to an osmotic and/or acid shock, while ensuring that the temperature of the final mixture ranges from 40°–55° C.

The aqueous suspension of a thickener preferably contains a proportion of acid sufficient to adjust the pH of the final emulsion to a value ranging from 3.0 to 5.0, preferably from 3.3 to 4.4.

In view of the particular, specific effect attributed to the use of acetic acid, the latter is added in a proportion sufficient to achieve a concentration of at least 0.15% by weight, preferably ranging from 0.25 to 0.40% by weight in the final emulsion.

On preparing an emulsion which preferably contains spices, spice extracts, flavouring substances, colouring agents, particles of vegetables, meat, chicken and/or fish, it is recommended to add the acid to an aqueous suspension of these ingredients, in order to bring about the acid shock.

A preferred embodiment of the process according to the present invention comprises adding a hot suspension of thickener to the emulsifier phase. The emulsifier phase may consist of egg yolk, whole egg, whey proteins, casein, soy protein, and the like. Preferably, however, egg yolk is used in a proportion of 2–8% by weight calculated on the final emulsion. The emulsifier and in particular egg yolk is subjected to a positive osmotic shock by adding for instance 7–12% by weight of NaCl or 20–35% by weight of sucrose calculated on the emulsifier. Alternatively, the above-mentioned aqueous phase containing particles of vegetables and meat may be added to the suspension of thickener along with the emulsifier phase. By diluting with the hot, aqueous suspension of thickener the microorganisms present are subjected to a negative osmotic shock which is accompanied with an acid shock and a temperature shock as a result of which the most heavily contaminated emulsifier phase is efficiently decontaminated. The final emulsion is obtained by mixing in a conventional manner the components thus treated, and in particular the emulsifier phase, the aqueous thickener phase and optionally the aqueous phase containing particles of vegetables or meat or the like, with the oil, which is usually not contaminated on the understanding, however, that care should be taken that up to and including the filling and sealing steps the temperature is maintained between 40° and 55° C. by the use of, for instance, heat exchangers.

Most preferably the containers are sealed hermetically so as to prevent any subsequent contamination and to ensure that the emulsion present in sealed containers is stable for six months or more.

The invention will now be illustrated by the following Examples.

EXAMPLE 1

A pre-emulsion was prepared, starting from:
5.89% by weight of egg yolk phase (11% by weight being NaCl)
49.30% by weight of oil
8.0 % by volume of an aqueous solution of acetic acid, the concentration of which is sufficient to achieve a pH of 3.6 in the final emulsion.

The final emulsion was prepared by quickly mixing the pre-emulsion with 36.8% by weight of a thickener phase consisting of starch which was heated at 90° C. and cooled to 75° C., while ensuring that the temperature of the final emulsion was brought to about 50° C. within 1 minute.

The final emulsion at this temperature was filled into containers which were subsequently sealed hermetically. After 6 months' storage in the sealed container the emulsion was found to be free of contamination. In the open container the emulsion was found to show no signs of contamination after three weeks.

EXAMPLE 2

A pre-emulsion was prepared, starting from:

|  | % by weight |
|---|---|
| Egg yolk having a NaCl content of 11% | 2.4 |
| Oil | 23.3 |
| Oil-soluble additives | 2.5 |

Practically simultaneously and under vigorous stirring an aqueous phase (28% by weight) containing particles of vegetables and acetic acid in a proportion sufficient to achieve a pH of 3.3 in the final emulsion, together with a starch suspension (43.3% by weight) of 80° C., were quickly added to the pre-emulsion, by which an oil-in-water emulsion with a temperature of 45° C. was obtained. This final emulsion was filled at this temperature into containers, which were subsequently sealed hermetically. After 6 months' storage in the sealed container the emulsion was found to be free of contamination. In the open container the emulsion was found to show no signs of contamination after 3 weeks.

We claim:

1. A process for the preparation of an edible, microbiologically stable oil-in-water emulsion from components comprising an oil, water, a thickener and an emulsifier, at least one of said components being microbiologically contaminated, comprising:
   (a) subjecting the microbiologically contaminated component to an osmotic shock and/or an acid shock;
   (b) subjecting said component from step (a) to a temperature shock by raising the temperature at least 20° C. to a value between 40° and 55° C. within three minutes;

(c) processing the component from step (b) with the remaining ingredients into a final emulsion;

(d) filling the final emulsion into containers; and (e) sealing the containers, the temperature of the emulsion during the processing, filling and sealing steps being maintained within the temperature range of 40° to 55° C.

2. A process according to claim 1 wherein the temperature of the temperature shock, and the processing, filling and sealing steps is from 45° to 50° C.

3. A process according to claim 1 wherein the temperature of the microbiologically contaminated component is raised at least 20° C. to 40° to 55° C. within one minute.

4. A process according to claim 1 wherein the temperature shock is effected at most one minute after effecting the acid shock.

5. A process according to claims 1, 2, 3 or 4 wherein the temperature shock is achieved by adding a heated aqueous suspension of the thickener heated to 70°–95° C. to the component which has been subjected to the osmotic and/or acid shock.

6. A process according to claim 5 wherein the thickener is starch.

7. A process according to claims 1, 2, 3 or 4 wherein the component to be subjected to the osmotic and/or acid shock and the temperature shock comprises the emulsifier.

8. A process according to claim 7 wherein the emulsifier comprises egg yolk.

9. A process according to claim 8 wherein egg yolk is subjected to an osmotic shock by contacting said egg yolk with sodium chloride in an amount of 7 to 12% based on the weight of the egg yolk.

10. A process according to claims 1, 2, 3 or 4 wherein said components further comprise spices, flavoring substances, coloring agents, and particles of vegetables, meat, chicken and/or fish.

11. A process according to claim 10 wherein an amount of an acidic aqueous suspension comprising at least one of said thickeners, spices, flavoring substances, coloring agents, and particles of vegetables, meat, chicken and/or fish; and mixtures thereof, said amount being suitable for use in an edible oil-in-water emulsion and sufficient to achieve a pH in the final emulsion ranging from 3.0 to 5.0, and said acidic aqueous suspension having a temperature of from 70° C. to 95° C., is quickly added with vigorous stirring to a mixture containing an emulsifier and oil.

12. A process according to claim 11 wherein acetic acid is added in a proportion sufficient to achieve a concentration in the final emulsion ranging from 0.15 to 0.40% by weight.

13. A process according to claims 1, 2, 3 or 4 wherein the filled containers are sealed hermetically.

14. A process according to claims 1, 2, 3 or 4 wherein the final emulsion contains no chemical preservative.

* * * * *